Figure 1:
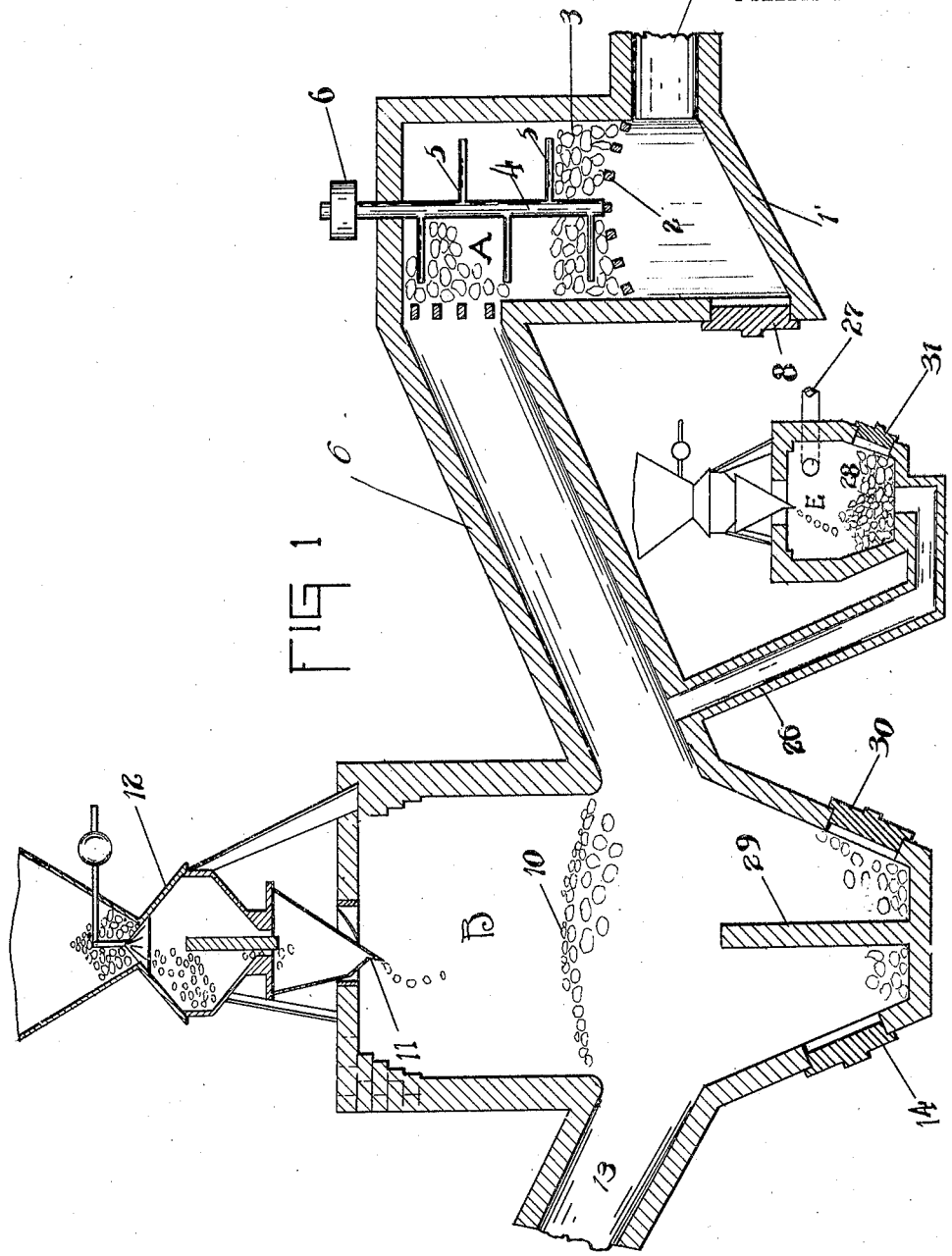

C. S. VADNER.
PROCESS OF RENDERING SMELTER FUMES USEFUL AND RECOVERY OF THEIR VALUES.
APPLICATION FILED MAR. 8, 1913.

1,103,165.

Patented July 14, 1914.
2 SHEETS—SHEET 1.

WITNESSES:
R. C. Farnow
W. J. Camomile

INVENTOR
Charles S. Vadner
BY
Frank B. Scott
ATTORNEY

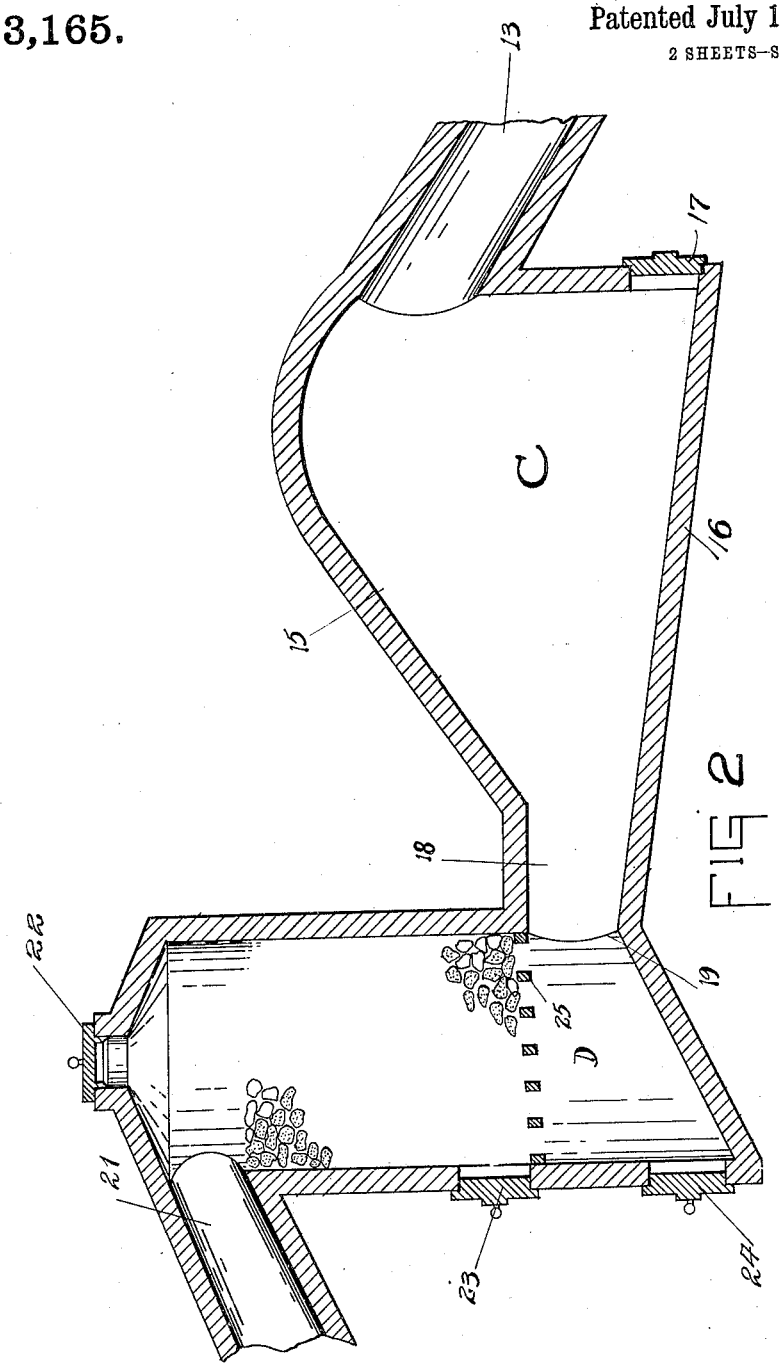

UNITED STATES PATENT OFFICE.

CHARLES S. VADNER, OF SALT LAKE CITY, UTAH.

PROCESS OF RENDERING SMELTER-FUMES USEFUL AND RECOVERY OF THEIR VALUES.

1,103,165. Specification of Letters Patent. Patented July 14, 1914.

Application filed March 8, 1913. Serial No. 752,997.

*To all whom it may concern:*

Be it known that I, CHARLES S. VADNER, a citizen of the United States, and a resident of Salt Lake City and county, Utah, have invented a new and useful Process of Rendering Smelter-Fumes Useful and Recovery of Their Values.

The apparatus and process hereinafter described is used in connection with the mechanical smelter fumes filter described in my application for patent Serial No. 747,577.

The object of my invention is to take the mechanically purified smelter fumes and by passing them through the apparatus described in this specification to convert or transform the noxious gases into useful ones.

I accomplish this object by the invention illustrated in the accompanying drawings, in which—

Figure 1 is a sectional view of the apparatus in connection with the mechanical filter that is used prior to passing the gases through the gas converting chamber. Fig. 2 is a sectional view of the condenser and gas scrubber.

Similar characters refer to similar parts throughout the several views.

The fumes coming from the smelter flues pass through the mechanical filter and there purified of their mechanical impurities are led through the descending flue 9 into the gas converter B. Instead of passing the hydrocarbon gases through the opening in the bottom of the side of the wall of the gas converter made by removing the plug 30, the hydrocarbon gases may be passed through the auxiliary coke tower. Should it be desired to use the coke tower E, any kind of hydro-carbon gases derived as by-products or otherwise from the distillation of any coal, crude oil or any hydro carbonaceous residues or by-products are led through the inlet 27 into the top of the chamber of the said coke tower. This tower is fed through a suitable hopper and contains a sufficient quantity of red hot coke 28 or any other suitable fuel. Ashes and clinkers are withdrawn at the plug 31. The conduit 26 leads from the bottom of the coke tower E to the descending flue 9. If coke is used, before the beginning of the operation, the coke 28 is set on fire and the coke 10 in the gas converter is also set on fire. The coke 28 and 10 is set on fire by removing the plugs 31 and 14 respectively and ordinary fires of shavings and wood are started and coke is added until same is in a well advanced state of incandescence when the plugs are put back and any further addition of coke that may be necessary, is made through the hoppers at the top of the respective gas chamber B and auxiliary coke tower E. The excess of air in the fumes will keep the coke glowing, in fact for economical reasons an excess of air is to be avoided as much as possible, as the fumes always contain an excess of free air which is drafted through the apparatus by a fan or other suitable means. The gases introduced through the pipe 27 are drawn downward through the red hot coke of the tower E whereby the said gases become hydrogenized, the carbon contained in them becoming fixed and retained by the red hot coke. The resulting hydrogenized hydrocarbon gases are drawn up through the conduit 27 to the descending flue 9 where they meet and mingle with the purified smelter fumes coming from the recovery tower A. The resulting mixture is then drawn through the red hot coke contained in the gas converter B. The hydrocarbon gases that have previously been passed through red hot coke decomposes at red heat, the purified smelter fumes in their component parts. The excess of oxygen in the smelter fumes unites with the carbon to form carbon monoxid or carbon dioxid according to the temperature and velocity and the amount of carbon present. It is desirable to maintain a high temperature in order to encourage the production of carbon monoxid, it being one of the purposes of my process to convert a portion of the fumes into carbon monoxid gas that may be used for power purposes.

Instead of the auxiliary coke-tower E, the hydrocarbon gases or hydrogen itself may be introduced at 30 directly into the gas converter. These gases in passing upward are deflected by the partition 29 and thrown toward the entrance of the smelter fumes from the recovery tower and mixed with them in the red hot coke 10, thus producing the same results as above described.

It will be understood that without departing from the spirit of this invention any other hydrogen producer can be substituted to produce hydrogen or hydrogenized hydrocarbon gases. Any liberated elementary sulfur is volatilized by the heat and passes through the ascending flue 13. Ashes and clinkers are withdrawn through the door 14.

In order to avoid excessive consumption of fuel, it is essential that the reaction of the gas converter take place as much as possible in the absence of air. The fumes from this gas converting tower are led through the ascending flue 13 into the condenser C. This condenser is suitably cooled by any convenient means, and the volatilized sulfur condenses upon the walls of the condensing chamber 15. When the said walls become sufficiently warm from the contact with the heated gases, the sulfur trickles down the side of the condensing chamber to the inclined floor 16. This floor slopes toward one end so that the liquid sulfur can be drawn off by gravity through the spout 17 and can be cast into pigs of convenient size to be handled. By these means sulfur that is so obnoxious in the form of smelter fumes can then be sold either as an article of merchandise or being absolutely harmless can be stored away in any convenient place. The balance of the fumes which do not condense and which are chiefly composed of carbonmonoxid and some impurities pass out through the horizontal flue 18 and enter into the scrubbing tower. This tower contains at a suitable height above the entrance 19 a grate 25 of any suitable design. Above this grate, the scrubbing tower D is filled with lumps of oxid of iron and lime rock 20. In passing through this mixture, the gases are chemically scrubbed and thereby purified of any trace of impurities or uncondensed sulfur or sulfur dioxid gas. The resulting carbonmonoxid gas is now pure and is drawn out through the descending exit flue 21 by a fan or other suitable means, placed at any convenient point in the said flue. This gas can then be preheated by waste gases from the smelter stacks and turned into flues leading to gas containers, or directly to gas engines for generating power or otherwise disposed of. The said scrubbing tower is filled at 22 and emptied at 23 and any liquid matter that percolates through the grate 25 may be drawn off the tap 24.

I claim—

1. The herein described process of purifying smelter fumes of their deleterious contents and rendering them useful and innocuous which consists in mixing the mechanically purified fumes with hydrocarbon gases and heating the said mixture to a high temperature in a gas converting chamber.

2. The herein described process of purifying smelter fumes of their deleterious contents and rendering them useful and innocuous which consists in mixing the mechanically purified fumes with hydro-carbon gases and heating said mixture to a high temperature in a gas converting chamber, thereby rearranging them in their combination, recovering the remaining combustible gases therein by cooling the said gases in any suitable manner, whereby part of the impurities and moisture are eliminated.

3. The herein described process of purifying smelter fumes of their deleterious contents and rendering them useful and innocuous which consists in mixing the mechanically purified fumes with hydrocarbon gases and heating said mixture to a high temperature in a gas converting chamber, thereby rearranging them in their combination, recovering the remaining combustible gases therein by cooling said gases in any suitable manner, whereby part of the impurities and moisture are eliminated, scrubbing the partially purified gases in any suitable scrubbing tower, containing lime rock and ferric oxid, whereby the remaining moisture assists in eliminating the remaining impurities and then passing the resultant combustible gases into receptacles for use for power and fuel purposes, whereby the said fumes are rendered useful and innocuous.

4. The herein described process of purifying smelter fumes of their deleterious contents and rendering them useful and innocuous which consists in mixing the mechanically purified fumes with hydrocarbon gases that have been previously passed through a column of red hot coke and heating said mixture to a high temperature in a gas converting chamber, thereby rearranging said fumes in their combination.

5. The herein described process of purifying smelter fumes of their deleterious contents and rendering same useful and innocuous which consists in mixing the mechanically purified fumes with hydrocarbon gases that have been previously passed through a column of red hot coke, heating said mixture to a high temperature in a gas converting chamber, thereby rearranging the fumes in their combination and recovering any remaining combustible gases therein by cooling said gases in any suitable manner, whereby part of the impurities and moisture are eliminated.

6. The herein described process of purifying smelter fumes of their deleterious contents and rendering same useful and innocuous which consists in mixing the mechanically purified fumes with hydro-carbon gases that have been previously passed through a bed of red hot coke, heating said mixture to a high temperature in a gas converging chamber, thereby rearranging said fumes in their combination, recovering any remaining combustible gases therein by cooling said gases in any suitable manner, whereby part of the impurities and moisture are eliminated, scrubbing the partially purified gases in any suitable tower containing lime rock and ferric oxid, whereby the remaining moisture assists in eliminating the remaining impurities and then passing the resultant combustible gases into receptacles for use for power and fuel purposes whereby such fumes are rendered useful and innocuous.

7. The herein described process of purifying smelter fumes of their deleterious contents and rendering same useful and innocuous which consists in mixing the mechanically purified fumes with hydrogenized hydrocarbon gases and igniting said mixture in a gas converting chamber, thereby rearranging the fumes in their combination.

8. The herein described process of purifying smelter fumes of their deleterious contents and rendering same useful and innocuous which consists in mixing the mechanically purified fumes with hydrogenized hydrocarbon gases and igniting said mixture in a gas converting chamber, thereby rearranging the fumes into their combination, recovering the remaining combustible gases therein by cooling said gases in any suitable manner, whereby part of the impurities and moisture are eliminated.

9. The herein described process of purifying smelter fumes of their deleterious contents and rendering them useful and innocuous which consists in mixing the mechanically purified fumes with hydrogenized hydrocarbon gases and igniting said mixture in a gas converting chamber, thereby rearranging the fumes in their combination, recovering any remaining combustible gases therein by cooling said gases in any suitable manner, whereby part of the impurities and moisture are eliminated, scrubbing the partially purified gases in suitable scrubbing towers, containing lime rock and ferric oxid, whereby the remaining moisture assists in eliminating the remaining impurities and then passing the resultant combustible gases into receptacles for use for power and fuel purposes, whereby such fumes are rendered useful and innocuous.

10. The herein described process of purifying smelter fumes of their deleterious contents and rendering same useful and innocuous which consists in mixing the mechanically purified fumes with hydrogenized hydrocarbon gases, then passing the mixture through a bed of red hot coke, thereby rearranging the fumes in their combination.

11. The herein described process of purifying smelter fumes of their deleterious contents and rendering same useful and innocuous which consists in mixing the mechanically purified fumes with hydrogenized hydrocarbon gases, thereby rearranging the fumes in their combination, recovering any remaining combustible gases therein by cooling said gases in any suitable manner, whereby part of the impurities and moisture are eliminated.

12. The herein described process of purifying smelter fumes of their deleterious contents and rendering same useful and innocuous, which consists in mixing the mechanically purified fumes with hydrogenized hydrocarbon gases, then passing the mixture through a bed of red hot coke, thereby rearranging the fumes into their combination, recovering any remaining combustible gases therein by cooling said gases in any suitable manner, whereby part of the impurities and moisture are eliminated, scrubbing the partially purified gases in suitable scrubbing towers, containing lime rock and ferric oxid, whereby the remaining moisture assists in eliminating the remaining impurities and then passing the resultant combustible gases into receptacles for use for power and fuel purposes, whereby said fumes are rendered useful and innocuous.

In witness whereof I have hereunto set my hand this 3rd day of March, 1913.

CHARLES S. VADNER.

Witnesses:
F. B. SCOTT,
R. C. FARNOW.

---

Copies of this patent may be obtained for five cents each, by addressing the "Commissioner of Patents, Washington, D. C."